No. 869,064. PATENTED OCT. 22, 1907.
B. CURL & H. J. HUDDLESTUN.
BROOM CORN HARVESTING MACHINE.
APPLICATION FILED MAY 3, 1905.

4 SHEETS—SHEET 1.

No. 869,064. PATENTED OCT. 22, 1907.
B. CURL & H. J. HUDDLESTUN.
BROOM CORN HARVESTING MACHINE.
APPLICATION FILED MAY 3, 1905.

4 SHEETS—SHEET 2.

Witnesses:
Jas E. Hutchinson
Bernard H. Bontz

Inventor:
B. Curl and H. J. Huddlestun,
By Sheldon A. Wood Attorneys

No. 869,064. PATENTED OCT. 22, 1907.
B. CURL & H. J. HUDDLESTUN.
BROOM CORN HARVESTING MACHINE.
APPLICATION FILED MAY 3, 1905.

4 SHEETS—SHEET 3.

No. 869,064.

PATENTED OCT. 22, 1907.

B. CURL & H. J. HUDDLESTUN.
BROOM CORN HARVESTING MACHINE.
APPLICATION FILED MAY 3, 1905.

4 SHEETS—SHEET 4.

Witnesses
Jas. E. Hutchinson
Bernard H. Bontz

Inventors:
B. Curl and H. J. Huddlestun,
By Sheldon A. Wood Attorney

UNITED STATES PATENT OFFICE.

BURTEN CURL AND HERBERT JEFFERSON HUDDLESTUN, OF ROSE HILL, ILLINOIS.

BROOM-CORN-HARVESTING MACHINE.

No. 869,064.  Specification of Letters Patent.  Patented Oct. 22, 1907.

Application filed May 3, 1905. Serial No. 258,733.

*To all whom it may concern:*

Be it known that BURTEN CURL and HERBERT JEFFERSON HUDDLESTUN, citizens of the United States, residing at Rose Hill, in the county of Jasper and State of Illinois, have invented certain new and useful Improvements in Broom-Corn-Harvesting Machines, of which the following is a specification.

This invention relates to improvements in harvesting machines, and has for its object the provision of a machine of this character which, although it may be found susceptible of other uses, is primarily designed for utilization in harvesting broom corn.

A machine made in accordance with the present invention possesses many novel characteristics, among which may be noted means for cutting the stalks of the corn at a predetermined distance from the ground; means for causing the upper or brush ends of the cut-off portions of the stalk to assume substantially the same level or plane; means for cutting off the bottom or uneven ends of said cut-off portions of the stalks to make the pieces desired to be collected and bundled of an approximately uniform length; and means for receiving and conducting said pieces to a convenient point of deposit.

Another characteristic of the machine is its adjustable feature whereby the evener and secondary cutter may be elevated or lowered as the case may be to bring them into operative relation to the stalks of average length in the particular field to be worked.

The foregoing, as well as other new features of importance will be apparent from the detailed description hereinafter given when read in connection with the accompanying drawings forming part hereof, and wherein a convenient embodiment of the invention is illustrated.

Figure 1:
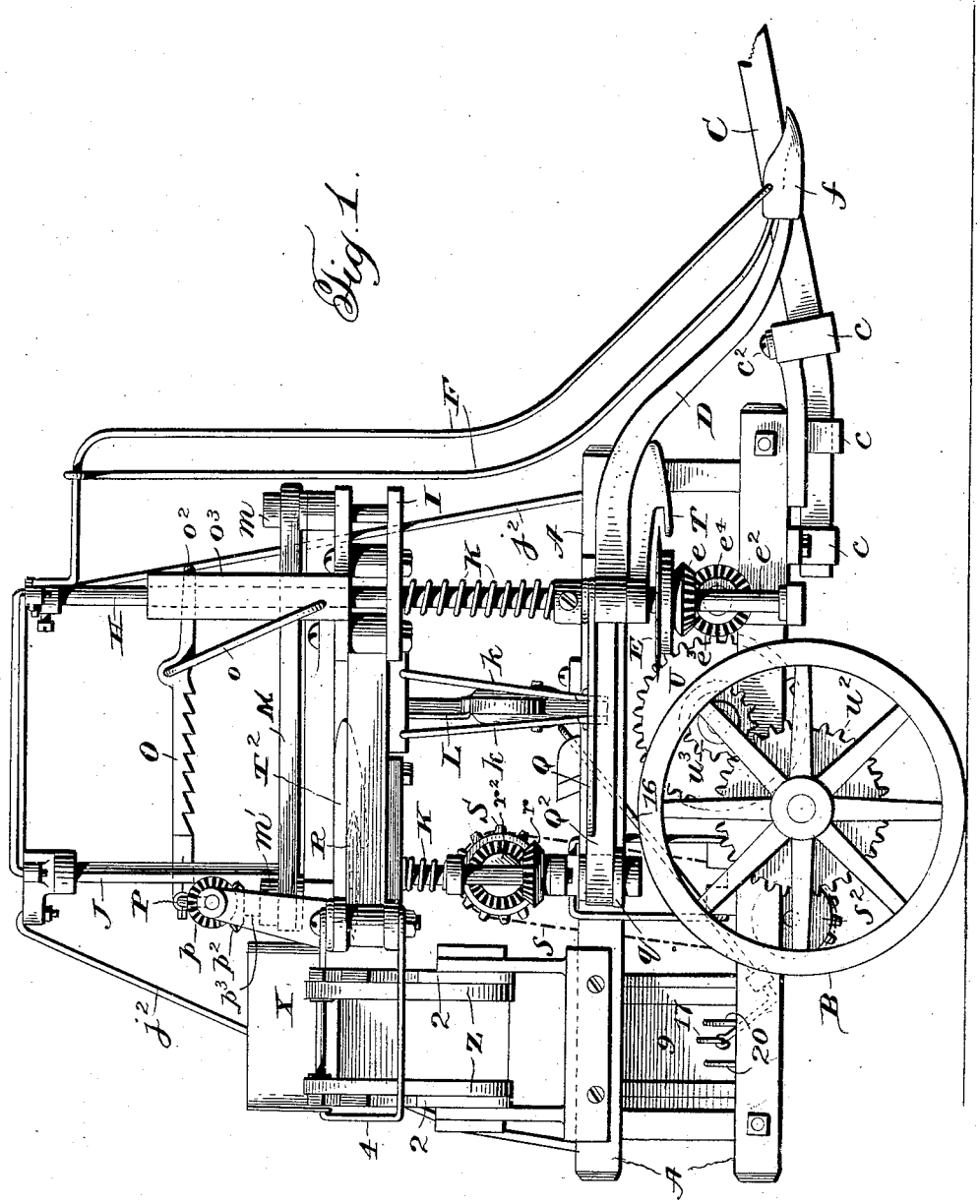
Figure 2:
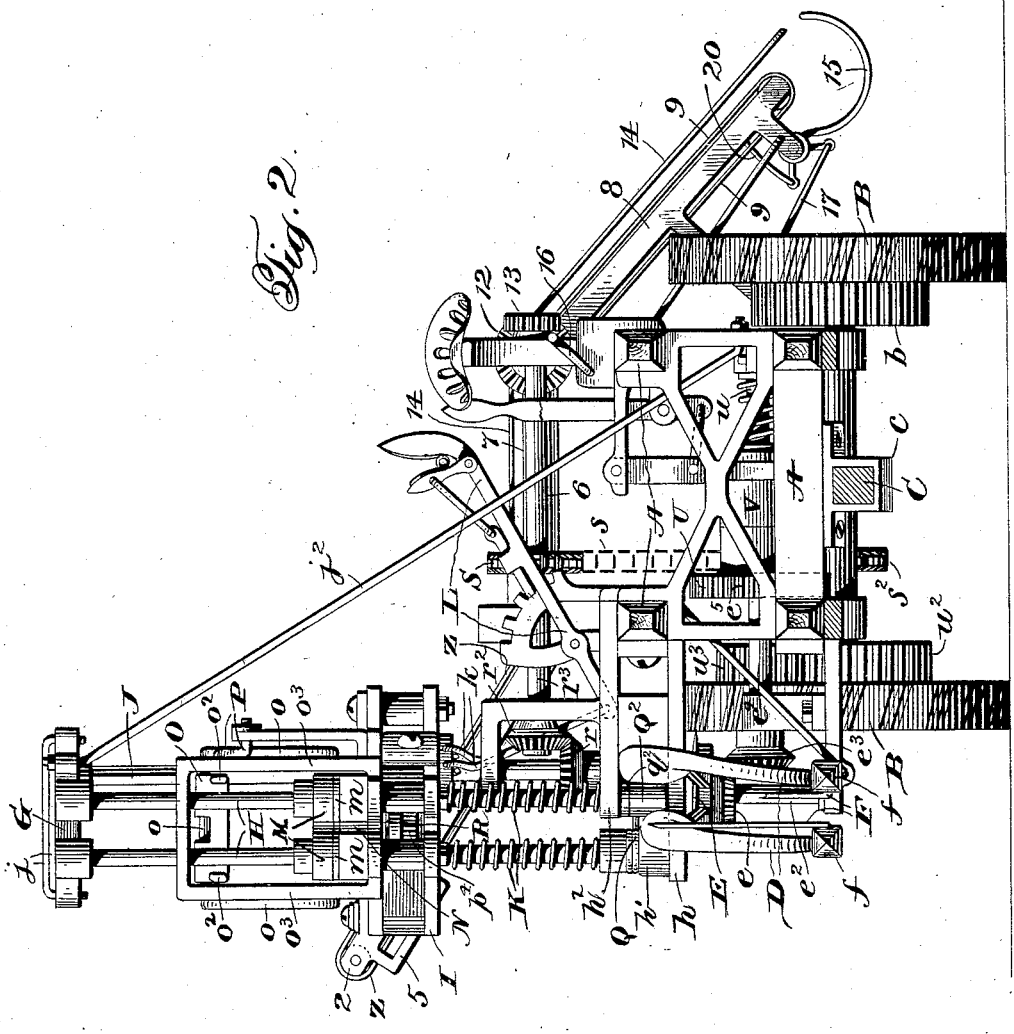
Figure 3:
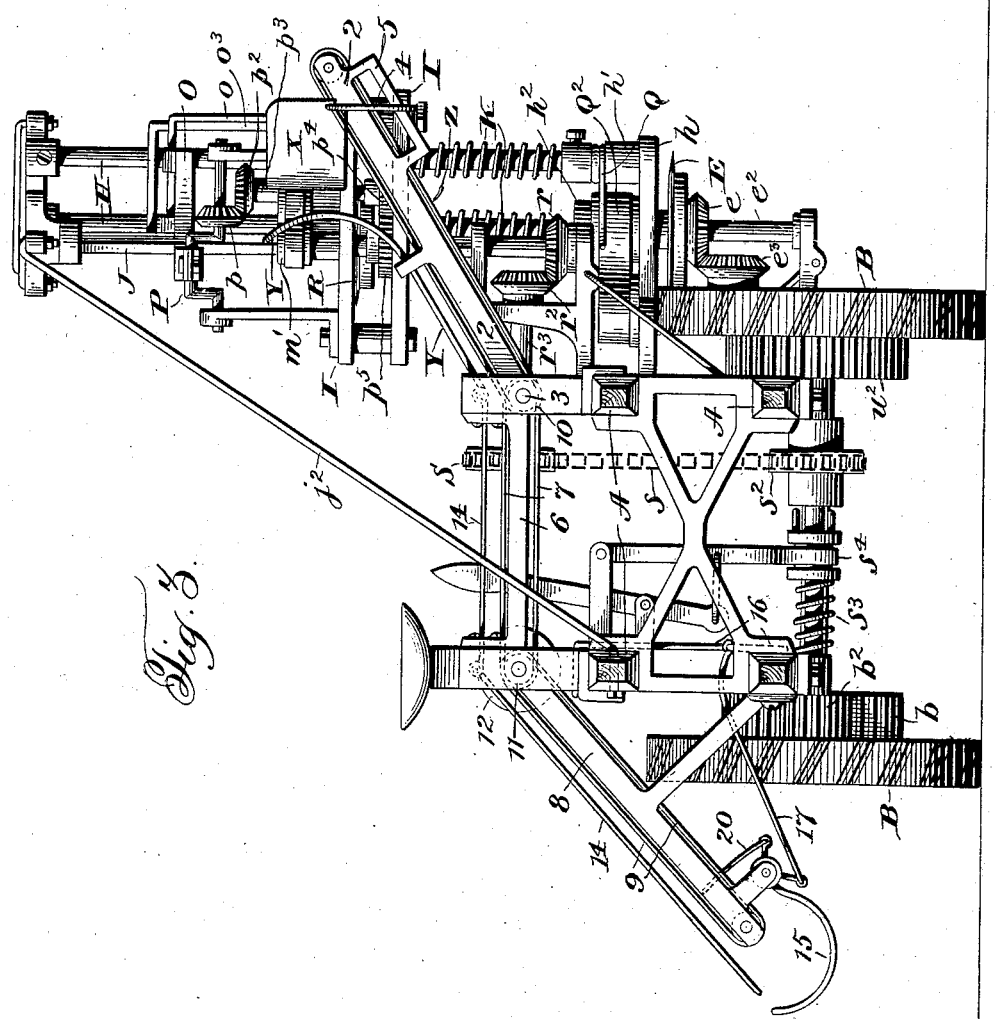
Figure 4:
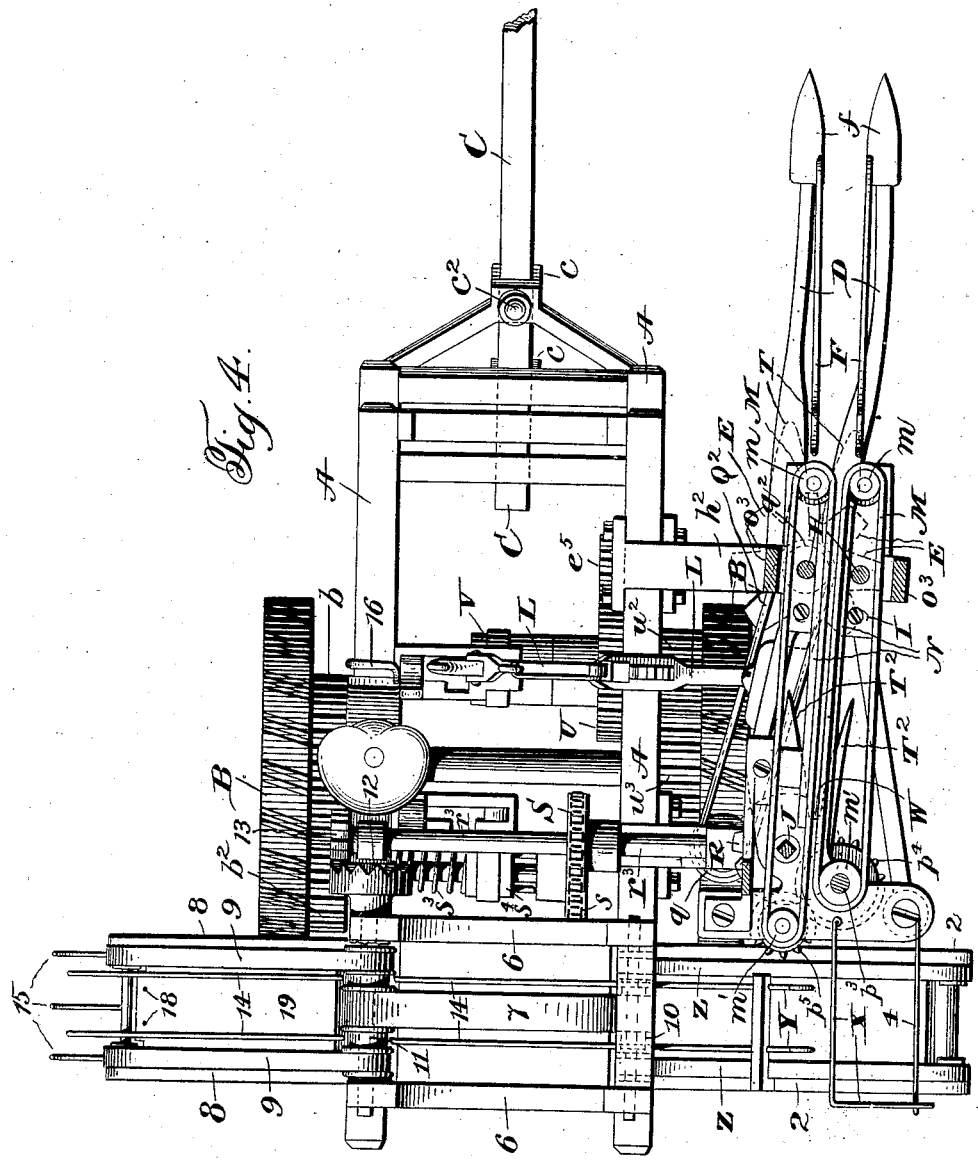

In the drawings, Figure 1 is a side elevation of the machine; Fig. 2, is a front view; Fig. 3, is a rear elevation; and Fig. 4, is a top plan view.

Referring more specifically to the drawings, wherein like reference characters refer to corresponding parts in the several views, A designates the main framework of the machine and B the traction wheels, the latter being of any desired type.

C is a tongue by which the machine may be drawn from place to place, and $c$ are depending brackets on the frame arranged to receive the tongue and in which said tongue is removably secured through the medium of a pin $c^2$ passing through alined apertures in one of the brackets and a cross bar of the frame.

Projecting forwardly from the machine at one side of the tongue just referred to are a pair of properly separated guide arms D, the same approaching relatively close to the base of the machine, and between which the stalks are guided as the machine progresses to a horizontally disposed rotary cutter E. Coöperating guide rods F, two on a side, secured at their upper ends to a cross-head G, and at their lower ends to shoes $f$ fitting the points of the guide-arms D, straighten out and bring into proper vertical alinement any stalks leaning to one side or the other of the passage-way formed between said rods and said guide arms. The cross-head is mounted at the upper ends of parallel vertically disposed uprights H, one seated in a suitable bearing $h'$ of a laterally projecting bracket or beam $h$ of the frame A, while the other projects through and is bolted to, or threaded into a corresponding bracket $h^2$ arranged above said first mentioned bracket, the manner of securing these uprights in place however, being discretionary.

Mounted for vertical adjustment upon the uprights H is a carrier I for certain of the working parts of the machine to be now defined, this carrier at its rear end loosely engaging the upwardly extending portion of an elongated shaft J. The shaft, as also the uprights, are braced against lateral deflection by cross-bars $j$ connecting them and braces $j^2$ running therefrom to the frame A, as clearly shown in the drawings. Springs K cushion the downward movement of the carrier and maintain the same in an initial position upon the uprights and shaft J, and to adjust the carrier either up or down relative to said initial position I provide a lever L pivoted upon the frame A, the outer end of which loosely connects with links $k$ in turn connected to the carrier. The lever is locked in adjusted position by any convenient means, that shown being a toothed segment and pawl.

Closely associated endless feeding belts M are mounted longitudinally of the carrier, the same traversing idlers $m$ at the forward end of the carrier, and driven pulleys $m'$ at the rear end thereof. These feeding belts are so arranged that they receive and frictionally grasp the stalks somewhat in advance of their engagement with the cutter E before referred to, and immediately upon the separation of the upper portion of the stalks from their butts by said cutter they are carried rearwardly through the guide-way N extending substantially through the carrier longitudinally thereof and in vertical alinement with the inner or adjacent portions of the feeding belts. Previous to any further cutting of the stalks to give the desired portions thereof a proper length, the upper or brush ends thereof should be brought into substantially the same plane or level, and to this end I provide a vibrator or jostler O at the top of the carrier, so arranged that when actuated the same will engage the heads or upper ends of the stalks and shake or jostle the longer stalks down until they are level with the heads or upper ends of the shorter stalks.

This vibrator is in the form of a horizontally disposed plate toothed upon its lower surface and mounted at its forward end to swing upon a substantially vertically disposed link o on the carrier, forwardly directed fingers $o^2$ working between side bars $o^3$ of the carrier preventing edgewise movement thereof. The rear end of the vibrator is connected with a crank P operated through the medium of a beveled pinion $p$ meshing with the pinion $p^2$ on a vertical shaft $p^3$ driven by a gear $p^4$ at the lower end thereof which in turn meshes with a pinion $p^5$ on the shaft J hereinbefore referred to, while said shaft J is operated in a manner to be hereinafter explained.

In the rearward travel of the stalks between the feeding belts and through the longitudinal way in the carrier, the lower ends of the stalks are confined between a horizontal rearwardly extending rod Q and endless belt $Q^2$, the latter passing around an idler $q$ and a driven pulley $q^2$ on the primary cutter shaft. R is the secondary cutter at the rear end of the longitudinal guideway in the carrier arranged to cut off the stalks to give them a predetermined uniform length subsequent to the leveling of the same by the vibrator or jostler O. This cutter is mounted upon the shaft J, and this shaft is rotated by a bevel pinion $r$ at the lower end thereof meshing with a complementary pinion $r^2$ on a shaft $r^3$ extending transversely across the machine and supported upon the top of the frame A, said shaft being provided with a fixed gear wheel S operatively connected by a chain $s$ with a sprocket $s^2$ on a transverse shaft $s^3$ at the bottom and rear of the frame A driven by a pinion $b^2$ at the end thereof engaged by a gear wheel $b$ rigid with the adjoining traction wheel B. The sprocket $s^2$ is loose upon the shaft $s^3$ but is connected thereto when it is desired that the same be rotated through the medium of any suitable clutch mechanism $s^4$, slidable over said shaft.

To maintain the operative relation between the rotating parts on the carrier and the shaft J while permitting the elevating and lowering of said carrier, said shaft is for the major portion of its length of irregular cross-section passing through correspondingly shaped apertures in said rotating parts.

T designates a V-shaped knife guard the arms of which are provided with slotted portions which are adapted to receive the blade of the cutter E, said knife guard serving to coöperate with said cutter to effect the severance of the stalks and also to keep the cutter clean. A V-shaped cutter guard $T^2$ similar in construction to the cutter guard T, is provided for the secondary cutter.

The primary cutter E is rotated by a pinion $e$ rigid with its shaft $e^2$ and arranged therebeneath to mesh with a complementary pinion $e^3$ on a short shaft $e^4$ mounted in suitable bearings on the frame A, and having a driven pinion $c^5$ at its inner end, said last mentioned pinion receiving its movement through a gear U on a shaft $u$ transversely mounted on the frame A and driven by a gear $u^2$ fixed to the adjoining traction wheel B through the medium of a pinion $u^3$ on the end of said shaft. The gear U is loose on its shaft but may be readily coupled therewith when desired by clutch mechanism V slidable on said shaft.

The instrumentalities whereby the stalks are discharged from the machine after passing through their second cutting operation may now be described. Immediately upon being cut by the rearmost or secondary cutter the stalks are carried still further in a rearward direction by the endless feeding belt, and just prior to their being freed from between said belts, the lower ends thereof abut against a stop W on the carrier, whereby they are caused to fall over in a rearward and downward direction between a deflector plate X and collecting arms Y both extending upwardly in a vertical direction, until said stalks rest in a flat condition upon endless conveyer belts Z. In the embodiment of the invention disclosed in the drawings, the inwardly extending V-shaped portion of the knife guard $T^2$ constitutes the stop W against which the lower ends of the severed stalks abut. These belts are mounted upon a frame 2 hinged at 3 to the frame A, and loosely connected to the carrier by means of a yoke 4 on the bottom turn of which runners 5 at the opposite edges of the frame 2 rest whereby the weight of the free end of the frame 2 is adequately supported, while at the same time affording sufficient play between the parts to enable said frame 2 and the belts and deflectors thereon to be simultaneously adjusted with the carrier I to at all times preserve their operative relation. The parts just described we will term the upper or adjustable run of our discharging apparatus or conveyer. The intermediate run comprises a horizontally disposed frame 6 on the frame A which supports an endless apron 7 arranged to receive the stalks from the belts Z and convey them to the lower run. This lower run is quite similar in general respects to the upper run and includes a frame 8 and endless belts 9. Of course the endless belts and apron of the conveyer pass around and are guided by suitable pulleys or wheels but these need not be specifically referred to other than to state that the intermediate pulleys at the respective ends of the intermediate run are in the nature of elongated drums 10 and 11, the apron and endless belts of the upper run engaging the former while said apron and the endless belts of the lower run engage the latter. The arrangement being such as described, the driving of the drum 11 through the medium of the pinions 12 and 13, said pinion 13 being fixed on the shaft $r^3$, will effect the travel of the apron and all of the belts in a downward direction as indicated by the arrows.

To prevent the stalks leaving the conveyer overhanging rods 14 are provided, the lower ends of the rods being free to permit the discharge of the stalks into a basket or the like 15 pivotally mounted at the bottom of the lower run of the conveyer and arranged to be dumped as desired by a foot-actuated crank lever 16 and link 17, whereby the stalks are deposited upon the ground or like place of deposit after the manner of windrows.

Of course when the basket is being dumped, some means should be employed to temporarily prevent the discharge of the stalks from the lower run of the conveyer, and for this purpose we pivot a pair of fingers to the basket shaft so arranged that as the basket is lowered in the dumping operation the fingers are projected through suitable apertures 18 in the bed 19 of said lower run, and into the path of the stalks carried by the belts thereof. These fingers are represented at 20.

It is to be understood that although one embodiment of our invention is disclosed herein and many incidental parts and mechanical arrangements, the invention is of a generic nature capable of other embodiments embracing various alterations, and substitutions for said parts and the arrangements thereof.

Having thus described the invention what is claimed as new and desired to be secured by Letters Patent is:—

1. In a broom corn harvester, a primary cutter for severing the heads of the stalks, means for supporting the severed heads in a substantially upright position a longitudinally movable vibratory jogger adapted to act on the heads of the severed stalks to even the same, and a secondary cutter adapted to act on said stalks after they have been evened.

2. In a broom corn harvester, a primary cutter for severing the heads of the stalks, means for supporting the severed heads in a substantially upright position means for evening the severed heads, a secondary cutter adapted to act on said heads after they have been evened, and means whereby the secondary cutter may be adjusted relative to the primary cutter.

3. In a machine of the character described, a primary cutter, means for supporting the severed stalks in a substantially upright position a vibrating jogger positioned to act on the heads of the severed stalks to even the same while in their upright position, a secondary cutter, and means for adjusting the jogger relative to said primary cutter.

4. In a machine of the character described, a primary cutter, an evener device, a secondary cutter, and a single means whereby the evening device and the secondary cutter may be adjusted toward and away from said primary cutter.

5. In a machine of the character described, a relatively fixed primary cutter, a vertically movable carrier, a device for evening the heads of the severed stalks and a secondary cutter both carried by said carrier, and feeding instrumentalities operatively associated with said carrier and evener device.

6. In a machine of the character described, a relatively fixed primary cutter, a device for evening the heads of the severed stalks, a secondary cutter, an adjustable carrier for said evening device and secondary cutter, and feeding instrumentalities operatively associated with said carrier, evener device and secondary cutter.

7. In a machine of the character described, a relatively fixed primary cutter, a secondary cutter, a device for evening the heads of the stalks severed by the primary cutter, an adjustable carrier for said evening device, and a pair of opposed feeding belts operatively associated with said carrier and adjustable therewith.

8. In a machine of the character described, a relatively fixed primary cutter, devices for evening the heads of the severed stalks, a secondary cutter, an adjustable carrier for said evening device and secondary cutter, and opposing feeding belts operatively associated with said carrier, evening device, and secondary cutter.

9. In a machine of the character described, a cutter, means for maintaining the severed stalks in a substantially upright position and a vibratory device adapted to act on the heads of the severed stalks while in a vertical position to even the same.

10. In a machine of the character described, a cutter, means for maintaining the severed stalks in a substantially upright position a vibratory device adapted to act on the heads of the severed stalks while in a vertical position to even the same, and means for adjusting said evening device relatively to said cutter.

11. In a machine of the character described, a primary cutter, a secondary cutter, means for conveying the stalks in a substantially upright position from the primary to the secondary cutter, and an evener device located between the primary and secondary cutters and acting on the heads of the stalks to even the same during their passage from the primary to the secondary cutters.

12. In a machine of the character described, a primary cutter, a secondary cutter, means for conveying the stalks in a substantially upright position from the primary to the secondary cutter, and a vibrating jogger acting on the tops of the stalks to even the same during their passage from the primary to the secondary cutter.

13. In a machine of the character described, a relatively fixed primary cutter, a device for evening the heads of the severed stalks, a secondary cutter, an adjustable carrier for said evening device and secondary cutter, and means for adjusting said carrier.

14. In a machine of the character described, a relatively fixed primary cutter, means for evening the stalks severed thereby, a vertically adjustable carrier, a secondary cutter carried by said carrier, and means for adjusting said carrier towards and away from the primary cutter.

15. In a machine of the character described, a relatively fixed primary cutter, means for evening the stalks severed thereby a carrier adjustable towards and away from said primary cutter, feeding instrumentalities and a secondary cutter carried by said carrier, and a discharge conveyer operatively associated with said carrier.

16. In a machine of the character described, feeding belts oppositely disposed to support stalks therebetween in an upright position, and means adapted to act on the heads of the stalks to even the same during their travel between said belts.

17. In a broom corn harvester, a primary cutter, means for evening the stalks severed thereby a secondary cutter, and means for adjusting the position of the secondary cutter towards and away from the primary cutter.

18. In a broom corn harvester, a primary cutter, a secondary cutter, means for adjusting the one relative to the other, means for feeding the severed stalks in an upright position from the primary to the secondary cutter, and means acting on the heads of the severed stalks to even the same during their travel from the primary to the secondary cutter.

19. In a machine of the character described, a primary cutter, a secondary cutter, endless carriers for conveying the stalks in a substantially upright position from the primary to the secondary cutter and an evening device acting on the tops of the severed stalks during their travel from the primary to the secondary cutter.

20. In a machine of the character described, a relatively fixed primary cutter, an evener device, a secondary cutter, and feeding instrumentalities intermediate said evener device and secondary cutter, in combination with an adjustable carrier for said evener device, secondary cutter and feeding instrumentalities.

21. In a machine of the character described, a relatively fixed primary cutter, an evener device, a secondary cutter, feeding instrumentalities between the evener device and secondary cutter, an adjustable carrier for said evener device, secondary cutter and feeding instrumentalities, and means for cushioning the movement of said carrier.

22. In a machine of the character described, a relatively fixed primary cutter, a vertically adjustable carrier, feeding instrumentalities, a secondary cutter carried by said carrier, and a discharge conveyer operatively associated with said carrier, said discharge conveyer having a movable run adjustable with the carrier.

23. In a machine of the character described, a relatively fixed primary cutter, a vertically adjustable carrier, a secondary cutter carried thereby, an evening device for the heads of the severed stalks carried by said carrier, and feeding instrumentalities operatively associated with said carrier for conveying the stalks from the primary to the secondary cutter.

24. In a machine of the character described, an evener device, a cutter, feeding instrumentalities between the evener device and cutter, an adjustable carrier for said evener device, cutter and feeding instrumentalities, and means for cushioning the movement of said carrier.

25. In a machine of the character described, a relatively fixed primary cutter, a vertically movable carrier thereabove, a secondary cutter carried by said carrier, mechanism carried by said carrier and adapted to carry the stalks in a substantially vertical position from the primary to the secondary cutter, and means for adjusting the carrier.

26. In a machine of the character described, feeding belts oppositely disposed to support stalks therebetween in an upright position, and a vibrating jogger adapted to act on the heads of the stalks to even the same during their travel between said belts.

27. In a machine of the character described, a primary cutter, a secondary cutter, opposed feeding belts extending from the primary to the secondary cutter engaging the sides of the stalks and holding them in an upright position from the primary to the secondary cutter, and means acting on the heads of the stalks to even the same during their travel between said belts from the primary to the secondary cutter.

28. In a machine of the character described, a relatively fixed primary cutter, a vertically movable carrier thereabove, a secondary cutter carried by said carrier, mechanism carried by said carrier adapted to convey the stalks in a substantially vertical position from the primary to the secondary cutter, and an evener device carried by said carrier and adapted to act on the heads of the stalks.

29. In a machine of the character described, feeding means, a relatively fixed primary cutter, an evener device, a secondary cutter, an adjustable carrier for the evener device and secondary cutter, and a discharge conveyer operatively associated with said adjustable carrier.

30. In a machine of the character described, a relatively fixed primary cutter, an evener device, a secondary cutter, feeding means, an adjustable carrier for said secondary cutter, and a discharge conveyer adjustable with said carrier operatively associated with said feeding means.

31. In a machine of the character described, a relatively fixed primary cutter, feeding means, guides leading to said primary cutter, and feeding means, an evener device, a secondary cutter, an adjustable carrier for said secondary cutter, and a discharge conveyer adjustable with said carrier operatively associated with said feeding means.

32. In a broom corn harvester, the following instrumentalities, to wit: a primary cutter, a secondary cutter, means feeding the stalks in a substantial upright position from the primary to the secondary cutter, means for evening the heads of the stalks during their travel from the primary to the secondary cutter, in combination with adjusting means whereby the device may be adapted for use on stalks of varying heights.

33. In a broom corn harvester, a relatively fixed primary cutter, a secondary cutter, feeding means for conveying the severed stalks from the primary to the secondary cutter, an adjustable carrier for said feeding means, and a conveyer operatively associated with said feeding means, said conveyer having a movable run adjustable with said carrier.

34. In a machine of the character described, feeding means, a conveyer operatively associated therewith, a dumping basket movably supported adjacent one end of said conveyer, and a stop operatively associated with said basket, said stop normally occupying a position between the ends and below the plane of the conveyer and arranged to be projecting upwardly above the plane of the conveyer when the basket is moved to dumping position.

35. In a device of the character described, a relatively fixed primary cutter, a secondary cutter, feeding mechanism for conveying the stalks in a substantially vertical position from the primary cutter to the secondary cutter, an evener device adapted to act on said stalks during their travel from the primary to the secondary cutter, and means for adjusting said secondary cutter and evener device relatively to said primary cutter.

36. In a machine of the character described, means for feeding stalks in an upright position, and means adapted to act on the heads of the stalks to even the same during their feeding movement.

In testimony whereof they affix their signatures in presence of two witnesses.

BURTEN CURL.
HERBERT JEFFERSON HUDDLESTUN.

Witnesses:
FRANK GIBSON,
L. O. REISNER.